Figure 1:
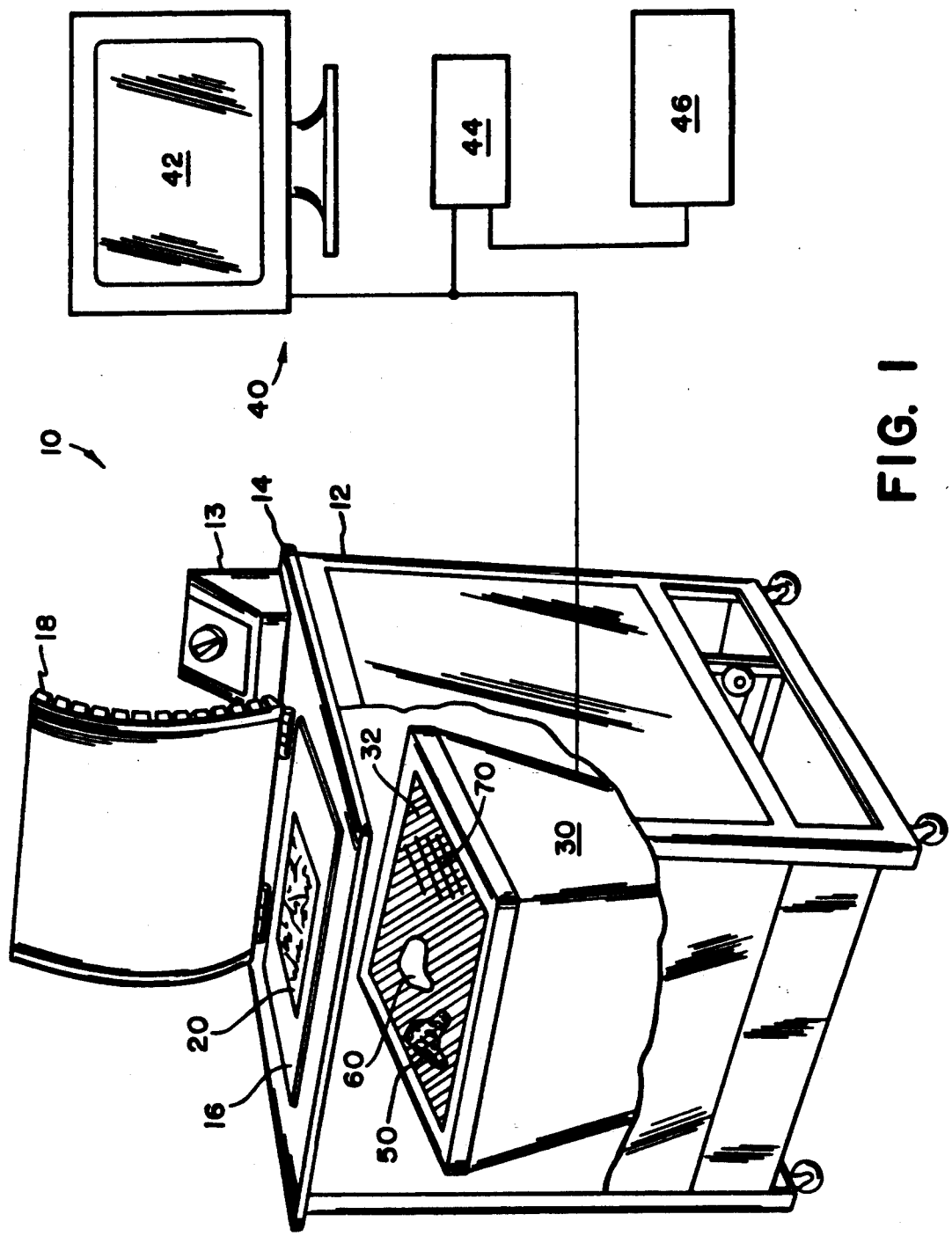

United States Patent [19]

Stouffer et al.

[11] Patent Number: 5,070,358
[45] Date of Patent: Dec. 3, 1991

[54] CUSTOM CONTACT PRINTER FOR SELECTIVE VISUAL CONTACT PRINTING

[75] Inventors: John D. Stouffer, South Bend; Ellen Y. Deak, Elkhart, both of Ind.

[73] Assignee: Stouffer Industries Inc., South Bend, Ind.

[21] Appl. No.: 494,430

[22] Filed: Mar. 16, 1990

[51] Int. Cl.⁵ .................... G03B 27/72; G03B 27/80
[52] U.S. Cl. ........................... 355/20; 355/81; 355/83
[58] Field of Search ................... 355/20, 81, 83

[56] References Cited

U.S. PATENT DOCUMENTS

| | | | |
|---|---|---|---|
| 2,927,520 | 3/1960 | Craig | 355/81 |
| 3,980,405 | 9/1976 | Tatsuno et al. | 355/20 |
| 4,168,120 | 9/1979 | Freier et al. | 355/38 |
| 4,263,001 | 4/1981 | Deutsch | 355/45 |
| 4,265,532 | 5/1981 | McIntosh | 355/20 |
| 4,286,868 | 9/1981 | Laska | 355/68 |
| 4,344,699 | 8/1982 | McIntosh | 355/81 |
| 4,814,597 | 3/1989 | Kruger et al. | 250/205 |
| 4,830,468 | 5/1989 | Stephany et al. | 350/336 |
| 4,835,576 | 5/1989 | Komori et al. | 355/40 |

FOREIGN PATENT DOCUMENTS 632406 12/1961 Canada.
646861 8/1962 Canada.
44-31309 12/1969 Japan.
840052 7/1960 United Kingdom.

OTHER PUBLICATIONS

Automatic Contrast Control in the Production of Aerophotographic Prints with the ELCOP Electronic Photoprinter of VEB Carl Zeiss, by J. Konieczny in Jena Review, vol. 19, No. 3, pp. 187–191 (1974).

*Primary Examiner*—Monroe H. Hayes
*Attorney, Agent, or Firm*—Larry J. Palguta

[57] ABSTRACT

The present invention comprises a contact printer (10) which utilizes a flat tube monitor (30) connected with a computer (40) that permits the image or light array (32) projected by the monitor (30) to be manually and selectively altered in accordance with an operator's evaluation of the image (32) directed upon a negative (20). The operator may selectively dodge, burn, or offset the intensity of the image (32) so that an adjacent area of the negative (20) receives a corresponding alteration. The printer (10) enables the provision of custom contact prints made in accordance with the operator's evaluation of the light array (32) shining through the negative (20) so that the negative (20) is selectively modified acccording to the operator's desire.

19 Claims, 1 Drawing Sheet

CUSTOM CONTACT PRINTER FOR SELECTIVE VISUAL CONTACT PRINTING

The present invention relates to a custom contact printer for selective visual contact printing, and in particular for a printer utilizing a computer controlled cathode ray tube.

Automatic photographic scanners have been provided which operate to alter the exposure of light imposed upon a negative towards a null point or neutral zone whereby the resulting developed photograph or print is made by differently exposed areas which provide a uniform appearance of the print. In other words, the thin and dense areas of the negative are automatically scanned by the scanner and exposed via a varying light intensity in order to provide a uniform appearance of the print. Such systems have proven useful for the commercial development of photographs and prints. However, for a professional photographic developer, contact printers provided by the assignee of the present application are preferable because the print is to be made according to the operator's individual or custom alteration of the negative in order to provide a unique copy. Automatic scanning photographic devices that provide photographic developing or printing do not permit such custom photographs or prints to be made because such devices move automatically toward the null or neutral point in order to provide an even or uniformly appearing photograph or print. The custom developer wishes to provide a custom or unique photograph or print.

Custom contact printers have been manufactured for many years. Contact printers produced by the assignee of the present application have been unique in that a platen rolls down and eliminates any air between the negative and print material. The platen is padded and when it engages the print material, negative and support on which the negative is positioned, superb contact between the platen, print material, negative and support enables contact printing without the undesirable effects caused by air bubbles. These contact printers have utilized a plurality of lights which are connected to flexible tubes so that the operator may move the lights up, down or sideways in order to provide precise dodging and burning of the negative. Dodging of the negative is the removal of light so that less light shines through the negative and a lighter portion of the print is effected. Burning is the provision of additional light to the negative so that a darkened portion of the print is effected. The lights of the contact printer may shine through color gelatin filters that are placed on a shelf above the lights and just below the printing support (glass) when color prints are desired. The gelatin filters have become increasingly difficult to purchase, and have served as the impetus for creating a new light system for effecting the dodging and burning of the contact printer. It is desirable that the contact printer be able to print all black and white materials in addition to all color materials.

The present invention provides a solution to the above problems by providing a contact printer for providing a photographic print in accordance with selective manual control of the contact printer, comprising means for engaging a negative with a clear support, a cathode ray tube disposed adjacent said support and able to emit a light array to the negative, and computer means for controlling the cathode ray tube, the computer means including manual controller means for altering the light array of the cathode ray tube according to an operator's evaluation of the negative.

One way of carrying out the invention is described in detail below with reference to the drawing which illustrates a specific embodiment in which:

FIG. 1 illustrates the custom contact printer of the present invention.

The custom contact printer of the present invention is indicated generally by reference numeral (10). Contact printer (10) comprises a chassis (12) which includes a top surface (14) having therein a clear or translucent support member (16) usually comprising a piece of glass. The top surface (14) has mounted thereon a rolling contact platen pad (18) which is applied and retracted by the printer (10). Platen pad (18) may, in some printers, be applied and retracted manually. Printer (10) may include a delay timer (13) which can be set to control the amount of time between the removal and application of platen (18) by printer (10).

Located within chassis (12) and below support (16) upon which is disposed a negative (20), is a cathode ray tube or flat tube monitor (30). The flat tube monitor emits a variable light array or image (32) that may be either black and white or color. A pixel comprises the picture element of the television image, and herein relates to small portions of the television image emitted by the monitor (30). It has been found that a typical monitor cathode ray tube has a curved tube surface. This causes light emitted therefrom (pixels) to shine upon the negative at a nonuniform or uneven pattern as a result of the light at the corners of the curved tube being emitted at an angle and greater distance relative to the flat surface of negative (20). Thus, a flat tube monitor such as a Zenith flat tube monitor (FTM) solves this problem by permitting the light array (light pixels) emitted therefrom to be directed evenly upon the entire surface of negative (20). The image (32) effected by the flat tube monitor or cathode ray tube (30) can be set to comprise over 250,000 shades of color variations and intensity including ranges in gray tones. This enables an exceedingly high variation in the type of light that may be directed upon support (16) and negative (20) during the printing process.

The contact printer (10) includes computer means designated generally by reference numeral (40). Computer means (40) includes an operations monitor (42) connected with a central processing unit or CPU (44), and a control mechanism or pixel controller (46) connected with the CPU (44). The operations monitor enables the operator to view a software menu which lists various selections that can be made for controlling the flat tube monitor (30). For example, pixel controller (46) enables the operator to place black pixels (50) upon areas of light array (32) of flat tube monitor (30). Because the operator views the negative from the above so that he sees the negative with the light array or image (32) projected thereupon, the selective placement of black pixels by the controller via the pixel controller (46) enables the operator to eliminate or reduce the amount of light that will shine through an area of the negative (20) during the printing process. Likewise, the operator via the pixel controller can introduce white pixels (60) upon image (32) so that selected areas of the negative (20) will receive more light during the printing process. The operator can modify the negatives which are of uneven density by creating the areas of black pixels (no light or dodging) below a thin spot of the negative so that those areas will receive less exposure or light intensity, and by creating areas of brighter pixels (more light or burning) below the dense areas of a negative so that those areas receive more exposure or light intensity. Also, the operator can perform fine tune dodging and burning by proportionately decreasing or increasing all three primary colors: red, blue, green or any one of the three colors, in an area (70) of the image (32) and corresponding area of the negative (20) by utilizing an offset command effected by the computer means (40). Additionally, the operator can select the exposure time in either of two ranges. One time range enables the selection of exposure time in hundreds of a second. Another time range enables the selection of exposure time in logarithmic 0.02 time increments which is the true photographic relation between time and density. The controller or operator can also enter into the computer means (40) the number of exposures desired by either having the central processing unit (44) count up for totalizing or count down as the printer (10) operates, and then stop operation.

The contact printer (10) of the present invention is operated by the placement of the negative (20) upon support (16) when the platen (18) is in the retracted position illustrated in FIG. 1. A keyboard (not shown) or other such mechanism for the operations monitor and CPU enables the operator to call up the software menu and then select the desired image to be emitted by flat tube monitor (30). The light array or image (32) shines light upon support (16) and negative (20) so that the light from image (32) shines through the negative and is viewed by the operator. The negative (20) with the light array (32) directed thereupon is evaluated by the operator who then utilizes the pixel controller (46) to perform any one of several alterations of the light array (32). Light array or image (32) can be either black and white or color, with the shade of the color varied and the intensity varied to include even ranges in gray tones. Fine tune dodging or burning via pixels of the image can be effected via the pixel controller so that an area of the image has all three or any one of the primary colors proportionally increased or decreased, and thereby providing a controlled density for a desired area or portions of the image. The pixel controller (46) can be utilized to effect black pixels such as pixels (50) so that no light or reduced amounts of light are directed by the monitor (30) upon the corresponding portion of negative (20), and white pixels such as white pixels (60) can be effected so that more light or a greater intensity of light is directed by monitor (30) upon a corresponding portion of negative (20). Fine tune dodging or burning can be effected to provide an offset area (70) of light array (32). The pixels are of a selected and predetermined dimension, however, their size can be altered via the computer means (40), and the size of the black pixels can be different from the size of the white pixels. These variations can be effected by merely making selections from the software menu provided on the screen of the operations monitor (42).

Once the operator has altered light array (32) of monitor (30) in accordance with his viewing of negative (20), then a photographic print medium such as contact printing paper can be placed over negative (20) on support (16). The monitor (30) is made ready for the actual printing operation by the operator entering directions or selecting operation instructions in the central processing unit (44). The platen (18) is then automatically (or manually in some printers) applied by printer (10) to the print medium, negative (20) and support (16) to eliminate atmosphere from thereabout, and the monitor (30) then emits the selectively altered image (32) for a predetermined period of time in accordance with the operator's instructions entered via a keyboard (not shown) of the CPU (44). Because contact printer (10) can be instructed to operate for a preselected number of cycles in order to produce a corresponding number of exposed prints, the operator needs merely to remove an exposed print when platen (18) is automatically or manually retracted and place a new unexposed contact print on support (16) and negative (20) before the platen (18) is automatically reapplied. Thus, the desired number of prints can be made with all of the prints being exposed in accordance with the previously altered image (32) of the monitor (30).

The present invention provides a significantly improved contact printer over those previously available. The printer of the present invention produces custom prints by means of the operator's manual and selective alteration or modification of the image of the monitor. Thus, selective manual dodging and burning is effected according to the operator's evaluation of the negative with the image directed thereupon. This permits the operator to provide a selectively and manually controlled exposure of the negative. The device does not require any automatic scanning mechanism, nor is any desired because prior automatic scanners produce a print having a uniform appearance, rather than a print having a custom modified appearance. The printer of the present invention enables the operator to select the colors of the background pixels which comprise the light array or image. Additionally, all of the movable lights of prior printing mechanisms are eliminated, as is the utilization of tissue paper, chalk marks, and gelatin filters. The printer of the present invention provides a substantial step forward for those involved in the provision of custom printing of photographic media.

What is claimed is:

1. A contact printer for providing a photographic print in accordance with selective manual control of the contact printer, comprising means for engaging a negative with a clear support, a cathode ray tube disposed adjacent said support and able to emit a light array to the negative, and computer means for controlling the cathode ray tube, the compute means including manual controller means for altering manually, as desired, any selected portion of the light array of the cathode ray tube according to an operator's visual evaluation of the negative.

2. The contact printer in accordance with claim 1, wherein said engaging means comprises a platen which engages said negative and support to remove atmosphere from about said negative.

3. The contact printer in accordance with claim 2, further comprising delay timer means for controlling applications and removals of said rolling platen with a predetermined delay of time between each removal and application of the platen.

4. The contact printer in accordance with claim 1, wherein the cathode ray tube comprises a flat tube monitor which has a flat tube surface so that the surface of the monitor is equidistant from the negative.

5. The contact printer in accordance with claim 4, wherein the altering of the light array comprises altering pixels of the light array by reducing the light intensity emission of the pixels so that darker areas are added to the light array.

6. The contact printer in accordance with claim 4, wherein the altering of the light array comprises altering pixels of said light array by increasing the light intensity emission of the pixels so that brighter areas are added to said light array.

7. The contact printer in accordance with claim 4, wherein the cathode ray tube effects a black and white light array.

8. The contact printer in accordance with claim 4, wherein the cathode ray tube effects a colored light array.

9. The contact printer in accordance with claim 8, wherein alteration of the colored light array is effected by changing selectively the color and intensity of pixels to provide offset pixels in order to control the intensity and color composition of said light array.

10. A method for making photographic prints by selectively controlling the intensity of light directed upon a negative, comprising the steps of:
(a) providing a contact printer with a cathode ray tube which is connected with computer means responsive to a control mechanism,
(b) placing the negative on a clear support of the printer so that light emitted from the tube passes through the negative,
(c) utilizing the control mechanism to alter manually and selectively any portion of the light array emitted by the cathode ray tube so that light of the selected portion shining through the negative is altered according to an operator's visual evaluation of the negative with said light array passing therethrough, and
(d) actuating the cathode ray tube via the control mechanism so that a print medium adjacent the negative receives the altered light from the cathode ray tube via the negative, to provide a print in accordance with the evaluation and alteration.

11. The method in accordance with claim 10, futher comprising the step of altering, via the control mechanism, the color of the light array emitted by the cathode ray tube.

12. The method in accordance with claim 10, further comprising the step of providing a flat cathode ray tube so that the tube emits light from a source equidistant from said negative.

13. The method in accordance with claim 12, wherein said utilization of control mechanism to alter manually and selectively the light array comprises altering a portion of said light array so that a dark area is included.

14. The method in accordance with claim 12, wherein said utilization of the control mechanism to alter manually and selectively the light array of the cathode ray tube comprises altering the light array so that a light area is included.

15. The method in accordance with claim 12, wherein the utilization of the control mechanism to alter manually and selectively the light array of the cathode ray tube comprises changing selectively the color and intensity of pixels to provide offset pixels in said light array in order to control the intensity and color composition of said light array.

16. The method accordance with claim 12, further comprising the step of utilizing the computer means to set an exposure time.

17. The method in accordance with claim 16, wherein the exposure time is one of a time period measurable in increments of a second and a time period measurable in logarithmic increments.

18. The method in accordance with claim 17, further comprising the step of utilizing the computer means to effect a predetermined number of operations of the cathode ray tube so that a corresponding predetermining number of print mediums may be produced.

19. The method in accordance with claim 18, further comprising the step of applying platen means to said medium prior to said actuation of the tube.

* * * * *